(12) United States Patent
Pfannstiel et al.

(10) Patent No.: US 9,283,893 B2
(45) Date of Patent: Mar. 15, 2016

(54) VISION-CONTROLLED INTERACTION FOR DATA SPECTACLES

(71) Applicant: Bayerische Motoren Werke Aktiengesellschaft, Munich (DE)

(72) Inventors: Jochen Pfannstiel, Munich (DE); Felix Lauber, Munich (DE); Wolfgang Spiessl, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/294,743

(22) Filed: Jun. 3, 2014

(65) Prior Publication Data

US 2014/0354516 A1 Dec. 4, 2014

(30) Foreign Application Priority Data

Jun. 4, 2013 (DE) .......................... 10 2013 210 354

(51) Int. Cl.
*G02B 1/00* (2006.01)
*B60R 1/00* (2006.01)
*G02B 27/01* (2006.01)

(52) U.S. Cl.
CPC ................ *B60R 1/00* (2013.01); *G02B 27/017* (2013.01); *B60R 2300/20* (2013.01); *B60R 2300/308* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC ............ G09G 5/00; G09G 1/00; G06F 3/041; G06F 3/044
See application file for complete search history.

(56) References Cited

U.S. PATENT DOCUMENTS

| 6,675,075 | B1 | 1/2004 | Engelsberg et al. |
| 7,401,920 | B1 | 7/2008 | Kranz et al. |
| 2005/0206583 | A1* | 9/2005 | Lemelson et al. ................ 345/7 |

(Continued)

FOREIGN PATENT DOCUMENTS

| DE | 198 02 220 A1 | 7/1999 |
| DE | 199 51 001 A1 | 5/2001 |

(Continued)

OTHER PUBLICATIONS

German Search Report dated Mar. 7, 2014, including English translation (nine (9) pages).

*Primary Examiner* — Michael Faragalla
(74) *Attorney, Agent, or Firm* — Crowell & Moring LLP

(57) ABSTRACT

A display system is disclosed, including data spectacles which have a spectacles frame and a display which is mounted at the spectacles frame such that it is situated in the field of vision of the wearer of the spectacles frame. The display system further includes an image-taking unit, particularly at least one camera set up for providing an image of an eye of the wearer of the data spectacles; a processing unit configured to: receive the image; determine the viewing direction of the eye in the image; determine the display area in the display in which an activating element is displayed; determine whether the viewing direction of the eye is directed at the display area of the activating element; and in response to a meeting of a condition: display assigned contents on the display, which are assigned to the activating element, on a display area that is larger than the display area of the activating element The condition is that the viewing direction of the eye is aimed at the display area of the activating element.

19 Claims, 4 Drawing Sheets

(56) References Cited

U.S. PATENT DOCUMENTS

2006/0109237 A1    5/2006   Morita et al.
2006/0238877 A1   10/2006   Ashkenazi et al.
2009/0303159 A1   12/2009   Gustafsson et al.

FOREIGN PATENT DOCUMENTS

EP            1 990 674 A1   11/2008
WO   WO 2013/066634 A1    5/2013

* cited by examiner

VISION-CONTROLLED INTERACTION FOR DATA SPECTACLES

CROSS REFERENCE TO RELATED APPLICATIONS

This application claims priority under 35 U.S.C. §119 from German Patent Application No. 10 2013 210 354.9, filed Jun. 4, 2013, the entire disclosure of which is herein expressly incorporated by reference.

BACKGROUND AND SUMMARY OF THE INVENTION

The invention relates to a display system having data spectacles, to a corresponding process and to a corresponding computer program.

Nowadays, display devices are known in the form of data spectacles, sometimes also called head-mounted displays (HMDs). These data spectacles are worn similarly to conventional spectacles (eyeglasses) for the correction of poor eyesight and have a display situated in the wearer's field of vision when worn as intended. This display may be designed for being viewed by one eye or for being viewed by both eyes and comprises particularly two partial displays—one for each eye. The display may comprise semi-transparent or non-transparent displays, the wearer of the data spectacles, in the case of semi-transparent displays, being able to perceive the presentation on the display as well as the reality situated behind it. In the case of a non-transparent display, the user sees only the presentation of the display.

Generally, data spectacles can also be used when driving motor vehicles. Particularly data spectacles with semi-transparent displays are suitable for this purpose because, in the case of these data spectacles, the driver can directly see the environment through the display. This makes it possible to see the traffic situation surrounding the vehicle, which is necessary for carrying out the driving task. However, also in the case of semi-transparent displays, there is the risk that the traffic situation is at least transparently covered up by presentations and the view of the traffic situation is thereby impaired. Simultaneously, the presentation may cognitively divert the driver's attention.

The interaction with presentations displayed on the data spectacles can first take place by means of known mechanical input devices or touch-sensitive input devices. For this purpose, for example, a touch pad may be provided laterally at the data spectacles. However, this type of interaction has the disadvantage that one hand or both hands of the user are necessary for this type of interaction. The user's hands will therefore no longer be available for mastering the driving effort, which may be dangerous with respect to driving safety.

Furthermore, the data spectacles can generally also be operated by a command input per voice operation. A process is known from the state of the for this purpose. However, acceptance of the voice input by users is reduced also because of technical difficulties during implementation.

Furthermore, systems have currently become known by which a person's eyes are imaged via a camera and their viewing direction is determined. Such systems are produced, for example, by Tobii Technology Co., Sweden.

In addition, from International Patent Document WO 2013/066634 A1, data spectacles having a camera are known for determining the pupil movement of the wearer of the data spectacles.

It is an object of the invention to control the presentations on data spectacles such that the driver of a vehicle, who is wearing data spectacles, can safely carry out his driving task despite an interaction with the data spectacles.

This and other objects are achieved in one aspect by providing a display system with data spectacles comprising a spectacles frame; a display which is mounted at the spectacles frame such that it is situated in the field of vision of the wearer of the spectacles frame; an image-taking unit, particularly at least one camera configured for providing an image of an eye of the wearer of the data spectacles; a processing unit configured for: receiving the image; determining the viewing direction of the eye in the image; determining the display area in the display in which an activating element is displayed; determining whether the viewing direction of the eye is directed at the display area of the activating element; in response to a meeting of a condition: displaying of assigned contents on the display, which are assigned to the activating element, on a display area that is larger than the display area of the activating element. The condition is that the viewing direction of the eye is aimed at the display area of the activating element, wherein the display area of the activating element is the area of the display which is occupied by the activating element. An activating element may be a symbol, a single-color surface, a miniature preview, etc. The display is mounted at the spectacles frame such that the wearer of the spectacles frame can see presentations on the display. The assigned contents may be a video stream, a photo, a text, a text with images and the like.

By means of an eye movement, particularly a "looking at" the activating element, the wearer of the data spectacles can thereby trigger a presentation of contents on the display, which are assigned to the activating element. The viewing direction is correlated with the image displayed on the data spectacles. Simultaneously, a larger area of the video screen will then be provided to the contents for the display. The user is therefore enabled to control the display of the data spectacles by eye movement. He can therefore retrieve contents according to demand. Since hands are not required for this control, the wearer of the data spectacles and the driver of a vehicle can continue to safely carry out the driving task. This type of interaction is intuitive for the wearer of the data spectacles because he only needs to look at areas on which he wants to have more information.

Instead of working with only one eye, the image-taking unit can also provide an image of both eyes of the wearer of the data spectacles, especially in two partial images. As required, two cameras—one for each eye—are to be provided for this purpose. The viewing direction can then be determined separately for each eye. Only when both eyes have essentially the same viewing direction, will the latter be used as the viewing direction. Otherwise, it can be determined that no viewing direction to be taken into account can be determined and subsequently also no assigned contents are to be displayed.

In a further development, the determining that the viewing direction of the eye is directed at the display area of the activating element includes determining that the viewing direction of the eye is directed longer than a threshold value time at the display area of the activating element. A time period is thereby defined for which the eye has to look into the activating direction before the activation takes place. In this manner, faulty activations are avoided. The threshold value time can also be called a "dwell time".

In a preferred embodiment, the processing unit is further configured to receive video images from a video camera, particularly of a video camera mounted on a vehicle, which provides images of the surroundings of the vehicle. The presenting of assigned contents on the display includes presenting the video images. In this manner, for example, images of a camera can be shown to the wearer of the data spectacles and driver of a vehicle by cameras at the vehicle. These cameras can take images of surrounding areas of the vehicle which are usually visible by use of exterior and interior mirrors of a vehicle. Looking into the mirrors can therefore be eliminated and replaced by eye movements and presentations in the data spectacles. The driver of the vehicle therefore no longer has to turn his head in order to be able to observe the surrounding areas of the vehicle visible by means of the exterior and interior mirrors. This may be an advantage particularly for drivers whose mobility is restricted.

It may be provided that the processing unit is further configured such that, in response to meeting the condition, an application of the processing unit is activated. The application may trigger the processing of data and the display of data, and particularly a transmission of data to a remote computer by way of a mobile radio data connection. The meeting of the condition therefore results in the activation of an application, thus in a function.

In an advantageous further development, the display is controlled such that several activating elements are displayed in respectively different display areas on the display of the data spectacles, whereby the processing unit is set up for the following: For each activating element: Determining its display area; determining whether and at which display area a look is directed; in response to the determination that the look is directed at the display area: displaying of assigned contents which are assigned to the activating element, at whose display area the look is directed, whereby the assigned contents are displayed on a display area which is greater than the display area of the activating element. A selection is therefore offered to the wearer of the data spectacles, similar to a menu, from which he can choose. Depending on the activating element, at which he is looking, the pertaining content is therefore displayed.

In a typical implementation, it is further provided that the processing unit is configured for the following: Determining that the viewing direction of the eye is not aimed at the display area of the assigned contents; in response to determining that the viewing direction of the eye is not aimed at the display area of the assigned contents, and at the preceding presenting of assigned contents: Terminating the presenting of the assigned contents. It is therefore provided that, as soon as the wearer of the data spectacles averts his look from the display area of the assigned contents, these will no longer be displayed. The assigned contents are therefore no longer superimposed on the look at the surroundings. The assigned contents can therefore easily be shown and hidden again. This is particularly advantageous during the showing and hiding of video streams of cameras directed toward the rearward surroundings of the vehicle.

In a further development, the processing unit is configured for the following: Receiving an instruction for operating particularly a mechanical operating element; determining whether the instruction is essentially received simultaneously or is shifted by not more than a predefined time period for determining that the viewing direction of the eye is aimed at the display area of the activating element; wherein the condition further comprises: The instruction is received essentially simultaneously or shifted by not more than a predefined time period for determining that the viewing direction of the eye is aimed at the display area of the activating element. An activation of the activating element with the display of the assigned content is therefore achieved in that the wearer of the data spectacles directs his look at the display area of the activating element and (essentially) simultaneously actuates, for example, a key. In this manner, it can be ensured that the activation of the activating element is intentional. Furthermore, the safety mechanism of the threshold value time until activation will no longer be necessary. For the activation, the view therefore no longer has to be directed for a minimum time at the assigned display area. Furthermore, this type of input can be intuitively learned by some wearers of the data spectacles. The operating element may be a key at the steering wheel of a vehicle.

The image-taking unit may be part of the data spectacles and be mounted on them. As an alternative, the image-taking unit may also comprise cameras arranged in the interior of a vehicle, which take an image of the head and the eyes of the wearer of the data spectacles.

In a further development, the display system is designed for use in a vehicle and further comprises: A sensing device for determining the head position and head orientation of the wearer of the data spectacles; wherein the processing device is further set up for the following: Determining of free spaces of the display in which the presentation, from the view of the wearer of the data spectacles, is essentially not superimposed on the surroundings outside the vehicle, or the surroundings relevant to the driving task; wherein the display area of the presented assigned contents is selected while taking into account the free spaces. When, for taking images of the eye of the wearer of the data spectacles, a sensing device outside the data spectacles is used, thus, for example, in the interior of the vehicle, the same sensing device may also be the sensing device for determining the head position and head orientation of the wearer of the data spectacles. This takes place by analyzing the image of the head of the wearer of the data spectacles. For this purpose, processes are known from the state of the art.

As an alternative or in addition, the determination of the head position and head orientation can also take place by means of a camera at the data spectacles, which essentially takes images in the direction of the central viewing direction of the wearer of the data spectacles (intended use of the data spectacles). In these images, the structure of the interior (for example, the framing of the windshield or of the side windows) can be recognized and its position can be recognized. A conclusion can be drawn therefrom concerning the head position and head orientation. In this further development, a search takes place for a location for the display of the assigned contents that is as advantageous as possible, i.e. interferes as little as possible. Other sensors, such as position sensors, can also be provided as the sensing device. The assigned contents should be displayed in the location of the display that hinders the wearer and driver the least when he carries out his driving task. It may be provided that the location of the display, thus the display area of the assigned contents, is continuously changed corresponding to the head movement. Typical advantageous display areas for the assigned contents but also the activating elements are in proximity of the road situated in front of the vehicle, above the horizon or over free spaces in the vehicle, for example, on the dashboard.

The processing device may be a computer that can be configured according to a program, thus an electronic computer system, as required, with several separate and spatially separated subunits.

Another aspect of the invention comprises a process for determining a presentation on data spectacles comprising a spectacles frame and a display, characterized by: Receiving an image from an image-taking unit, particularly at least one camera which is set up for providing an image of an eye of the wearer of the data spectacles; determining the viewing direction of the eye in the image; determining the display area on the display in which an activating element is displayed; determining whether the viewing direction of the eye is aimed at the display area of the activating element; in response to the meeting of a condition: Displaying of assigned contents on the display, which are assigned to the activating element, on a display area that is larger than the display area of the activating element, wherein the condition comprises: The viewing direction of the eye is aimed at the display area of the activating element. The process can be further developed corresponding to the above explanations concerning the display system.

In another aspect of the invention, a computer program causes a computer to execute the above-presented or further developed process.

Other objects, advantages and novel features of the present invention will become apparent from the following detailed description of one or more preferred embodiments when considered in conjunction with the accompanying drawings.

DETAILED DESCRIPTION OF THE DRAWINGS

In all figures, identical reference symbols relate to corresponding elements.

Figure 1:
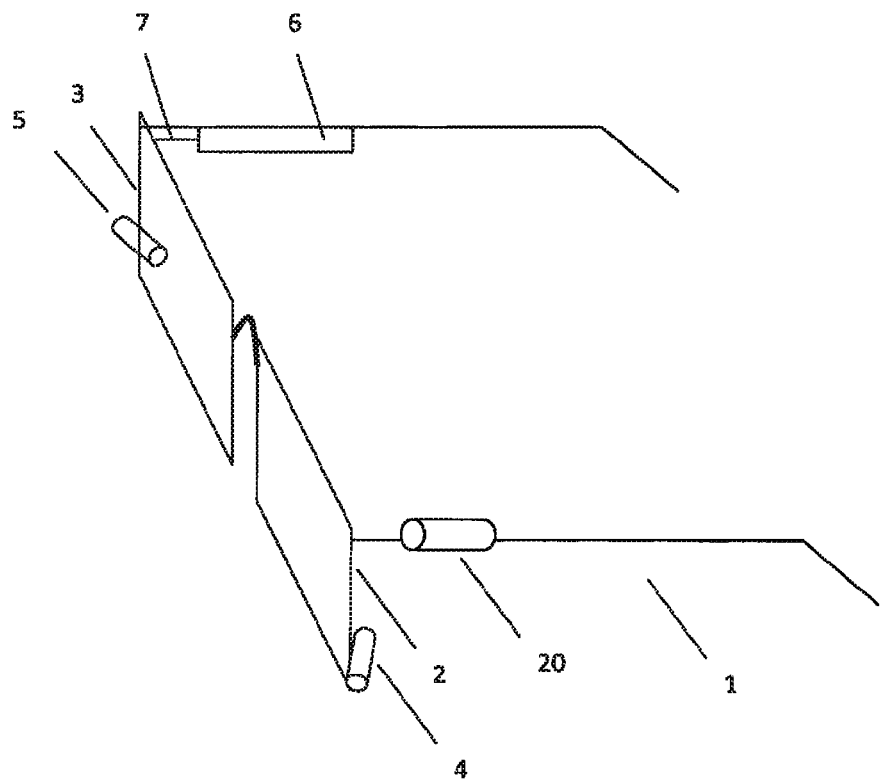
FIG. 1 is a schematic view of a display system according to an embodiment of the invention.

FIG. 1 illustrates a display system according to an embodiment. The display system 1 includes data spectacles which have two semi-transparent displays, in each case, for the left and the right eye respectively. Furthermore, the display system 1 includes two cameras 4 and 5, in each case for the left and the right eye respectively, as well as a processing unit 6, which is connected by way of a signal line 7 with the two displays 2 and 3 as well as the cameras 4 and 5. During operation, the camera 4 continuously images the left eye, and the camera 5 continuously images the right eye of the wearer of the display system. Both cameras 4 and 5 transfer their images to the processing unit 6. In some implementations, the processing unit 6 is separate from the data spectacles, and the transmission takes place by way of a longer signal line or in a wireless manner. The data spectacles further include camera 20, which provides images in the direction of the central viewing direction when the wearer wears the data spectacles as intended. The camera 20 is also connected with the processing unit 6. The camera 20 is aligned corresponding to the axis of symmetry of the data spectacles. During operation, the processing unit 6 continuously receives the images of the cameras 4, 5 and 20.

In the images of the cameras 4 and 5, the iris of the eye is recognized in each case, and the viewing direction of the wearer of the data spectacles is determined therefrom. Corresponding processes are known from the prior art. This viewing direction is correlated to display areas of activating elements. When the viewing direction aims at an activating element, the assigned content is displayed in a larger display area. The assigned content is displayed on both displays, specifically such that it is at a comfortable distance for the wearer of the data spectacles but closer to the surroundings of a vehicle. Typically, the brightness of the presented assigned contents will be greater than that of the surroundings of the wearer of the data spectacles. The wearer of the data spectacles can therefore effortlessly recognize the assigned and presented contents. In the event, however, that the brightness of the surroundings is so great that the presented contents cannot be clearly recognized, it is additionally provided that the contents are displayed to the wearer at a distance which is shorter than the distance of the surroundings of the vehicle in which the wearer is situated. In this manner, the wearer, by changing the focus on the distance of the presented contents, can see these despite the slight difference in brightness or despite the lower brightness of the presented contents. When focusing on the more closely presented contents, the surroundings appear blurred to the driver and therefore do not have such a disturbing effect.

It may further be provided to switch the display areas of the displays 2 and 3, which display the assigned contents, from a semi-transparent mode to a non-transparent mode, for example, by an additional electro-chromatic layer on the displays 2 and 3. This electro-chromatic layer could have a transparent and a matt mode, which can be selected as a function of the location. In this case, the electro-chromatic layer would be activated in the display areas of the assigned contents (matt mode) and scatter the ambient light there and additionally provide the backlighting of the display areas of the assigned contents of the semi-transparent display 2 and 3. In this manner, only the assigned contents are visible in the display areas of the assigned contents.

Figure 2A:
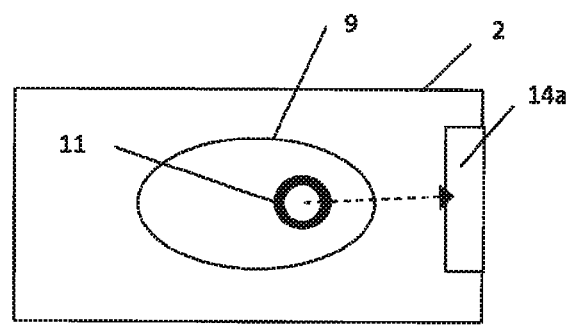
FIGS. 2a and 2b are schematic views of presentations on a display of data spectacles according to one embodiment.
Figure 2B:
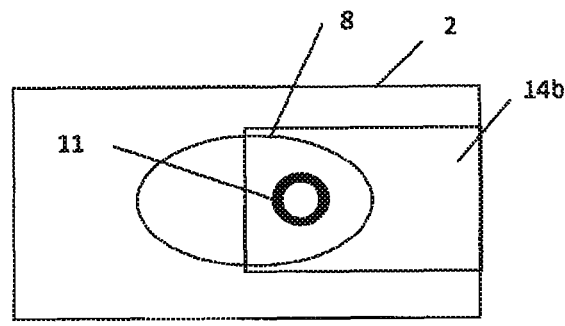

FIGS. 2a and 2b are schematic top views of the presentations on the display 2 of data spectacles and of an eye 9 according to an embodiment. In FIG. 2a, the display 2 displays an activating element in the display area 14a, here, on a single-color surface. The wearer of the data spectacles looks at the display area 14a with his eye 9. In order to determine the viewing direction, in an image of the camera 4, compare FIG. 1, (not shown in FIG. 2a), the iris 11 of the eye 9 is recognized. Based on this recognition, the viewing direction of the eye 9 is determined, which is illustrated in FIG. 2a by a broken arrow. It will then be determined whether the viewing direction of the eye is aimed at the display area of the activating element. This is so in the present case. In response to this determination, the content assigned to the activating element is displayed, which is shown in FIG. 2b. The assigned content is displayed in the display area 14b. As illustrated, the display area 14b of the assigned content is larger than the display area 14a of the activating element. The assigned content is, for example, the video stream of a camera of a vehicle which images an area of the surroundings of the vehicle situated in the rear and on the left of the vehicle. A look into the display area 14b and the video stream situated there can therefore replace looking into the left outside mirror (left side-view mirror) of a vehicle.

Figure 3A:
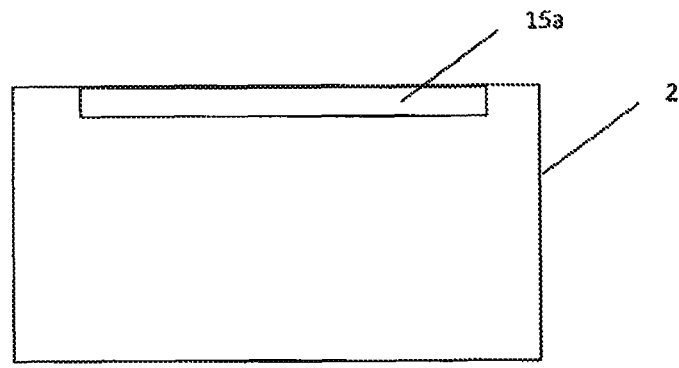
FIGS. 3a and 3b are schematic views of the presentations on a display of data spectacles according to a further embodiment.
Figure 3B:
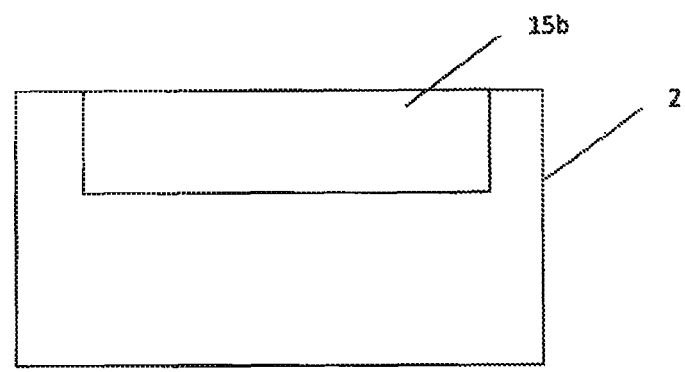

FIGS. 3a and 3b are schematic views of the presentation on the display 2 of data spectacles according to a further embodiment. In this embodiment, an activating element is displayed to the wearer of data spectacles in the display area 15a. When the activating element is viewed, the display area is enlarged to display area 15b. In the display area 15b, the video stream of a camera of a vehicle is displayed which is part of the activating element, which vehicle is driven by the wearer of the data spectacles. The video stream shows the area behind the vehicle which the driver which would normally see by means of the interior rear-view mirror. The look into the display area 15b can therefore replace looking into the rear-view mirror.

Figure 4:
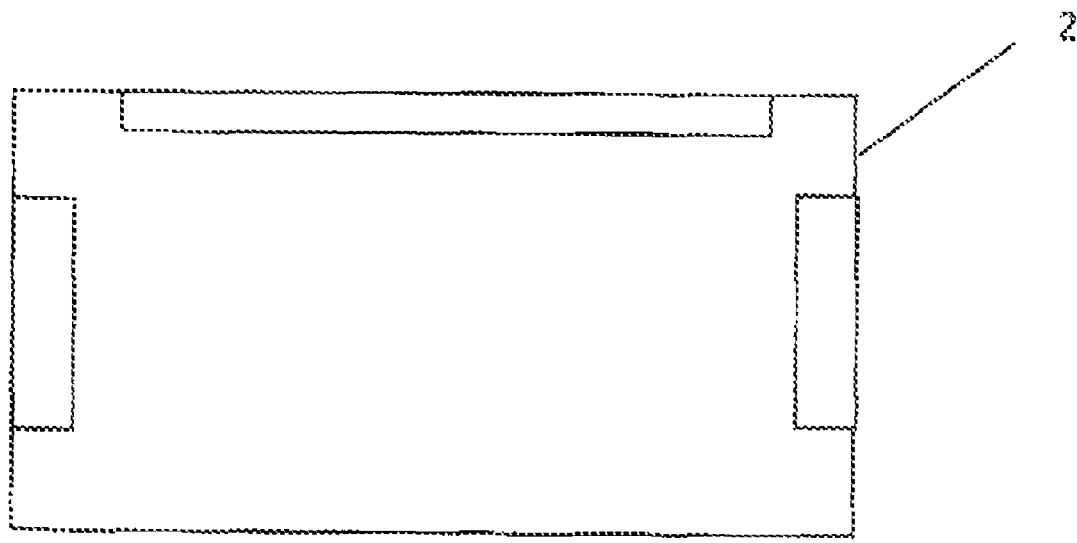
FIG. 4 is a schematic view of the presentations on a display of data spectacles according to another embodiment.

It is contemplated to simultaneously display the display areas 14a and 15a of FIGS. 2a and 3b and, in the case of a look at the respective display area, display either the display area 14b or 15b, including the respective video stream. Furthermore, analogous to the display area 14a and 14b as well as its video stream, display areas and the display of an assigned video stream may be provided as the replacement for looking into a right outside mirror (right side-view mirror). In this manner, every look into one of the exterior mirrors or the interior rear-view mirror can be replaced by a look at the respective activating element and the then displayed display area with the respective video screen. A further development of the activation areas in such a presentation is illustrated in FIG. 4. A looking at the lateral activating elements in each case results in the display of a video stream of one of two cameras which look to the left or to the right to the side of and behind the vehicle.

Figure 5:
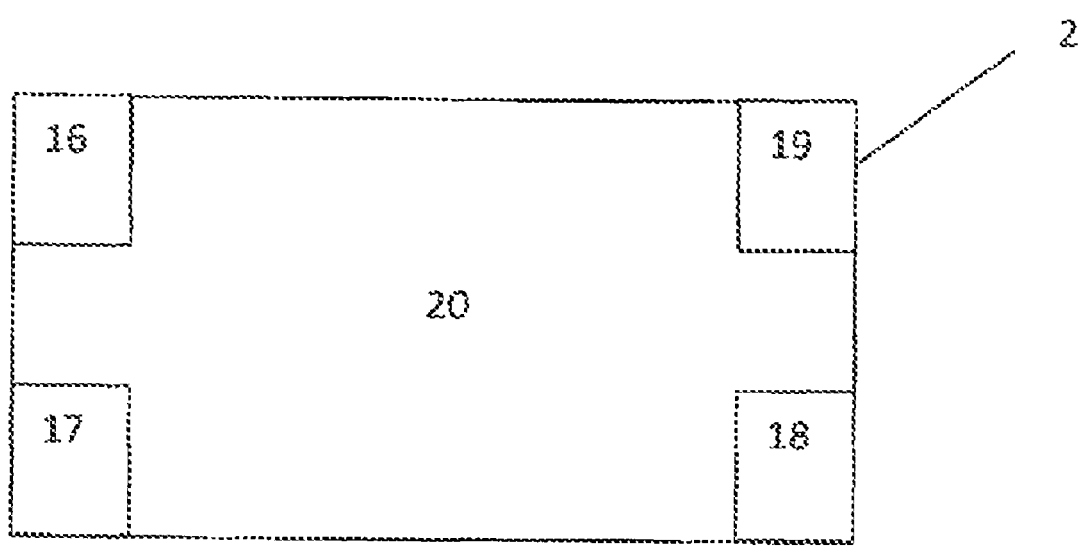
FIG. 5 is a schematic view of the presentations on a display of data spectacles according to another embodiment.

FIG. 5 schematically illustrates the presentations on a display 2 of data spectacles according to another embodiment. According to this embodiment, several activating elements 16 to 19 are displayed in the display 2, which are each assigned to a function. The display area 20 shows the content of the function at which the wearer of the data spectacles has last directed his look. An "empty" content can be assigned to one of the areas 16 to 19, for example, the display area 19, in order to permit a clearing of the central display area 20. It may be stated that, as a result of a look at one of the display areas 16 to 19, the respectively assigned function is prioritized.

Figure 6:
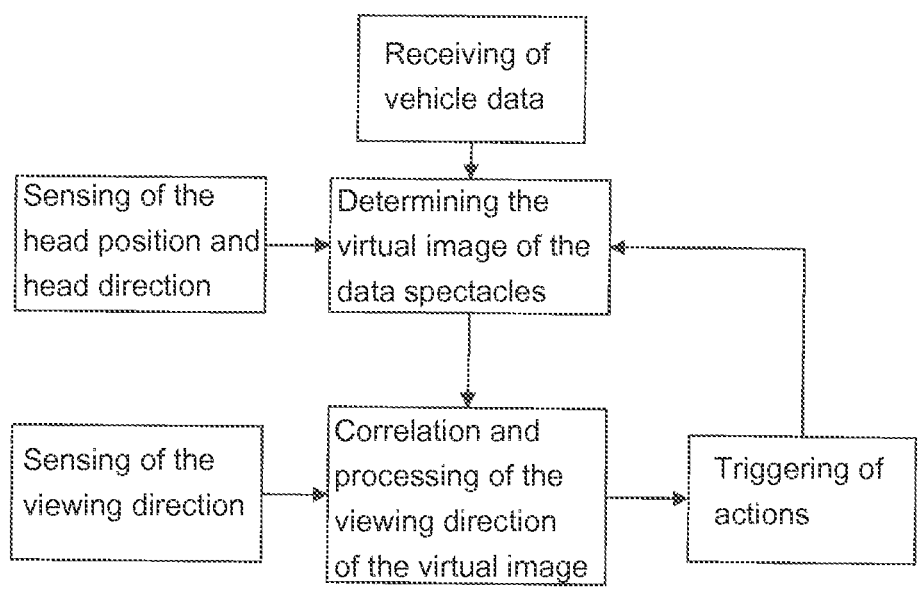
FIG. 6 is a flow chart illustrating the process steps according to an embodiment.

FIG. 6 is a flow chart of process steps for which the processing unit is configured, and of their mutual interaction according to one embodiment. For determining the virtual image (of the presentation) on the data spectacles, received vehicle data and the sensed head position and head direction are taken into account. The vehicle data may be video streams of cameras which take images in directions which are normally viewed by the driver by way of automobile mirrors. Furthermore, the virtual image is displayed such that, if possible, no viewing areas of the driver relevant to the driving task are covered up by activating elements or graphics on the display of the data spectacles, for the purpose of which the detected head position and head direction are taken into account.

The virtual image is correlated with the detected viewing direction in order to determine whether the wearer of the data spectacles is looking at an activating element and at which activating element he is looking. When a look at an activating element is detected, actions are triggered, as, for example, the changing of the display and thereby the changing of the virtual image on the data spectacles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A display system, comprising:
   data spectacles comprising a spectacles frame and a display, the display being mounted at the spectacles frame so as to be situated in a field of vision of a wearer of the spectacles frame;
   an imaging unit that provides an image of an eye of the wearer of the spectacles frame; and
   a processor operatively configured to:
      receive the image,
      determine a viewing direction of the eye in the image
      determine a display area in the display in which an activating element is displayed,
      determine whether the viewing direction of the eye is directed at the display area in which the activating element is displayed,
      in response to meeting a defined condition, display assigned content on the display, the assigned content being assigned to the activating element and being displayed on a larger display area than that of the display area of the activating element, wherein the condition is met when the viewing direction of the eye is aimed at the display area of the activating element, and
      determine whether the viewing direction of the eye is not aimed at the larger display area of the assigned contents, and following the presenting of the assigned contents, terminating the presenting of the assigned contents when the viewing direction of the eye is not aimed at the larger display area of the assigned contents.

2. The display system according to claim 1, wherein the imaging unit is at least one camera.

3. The display system according to claim 1, wherein the processor is further configured to determine the viewing direction of the eye at the display area of the activating element based on a determination that the viewing direction of the eye is directed at the display area of the activating element for longer than a defined threshold value time.

4. The display system according to claim 1, further comprising:
   a video camera mounted on a vehicle, the video camera providing video images of surroundings of the vehicle; and
   wherein the processor is further configured to receive the video images from the video camera and present the video images as the assigned contents on the display.

5. The display system according to claim 1, wherein the processor is further configured to activate an application of the processor in response to meeting the condition.

6. The display system according to claim 1, wherein the display is controlled such that several activating elements are displayed in respectively different display areas on the display of the data spectacles, and further wherein the processor is configured to:
   determine a respective display area for each of the several activating elements;
   determine whether and which of the respective display areas the eye of the wearer is aimed at, and
   in response to the eye of the wearer being aimed at a respective display area, display assigned contents assigned to the activating element of the display area, wherein the assigned contents are displayed on a larger display area of the activating element.

7. The display system according to claim 1, wherein the processor is further configured to:
   receive an instruction for operating a mechanical operating element,
   determine whether the instruction is received simultaneously or within a predefined time period in which it is determined that the viewing direction of the eye is aimed at the display area of the activating element, and
   wherein the condition further comprises that the instruction is received simultaneously or within the predefined time period.

8. The display system according to claim 1, wherein the imaging unit is mounted at the data spectacles.

9. The display system according to claim 1, further comprising:
- a sensor for determining a head position and a head orientation of the wearer of the data spectacles, the display system being configured for use in a vehicle, and
- wherein the processor is further configured to:
  - determine free spaces of the display in which a presentation is essentially not superimposed on surroundings outside the vehicle or surroundings relevant to a driving task from a view of the wearer of the data spectacles, and
  - wherein the display area of the presentation is selected while taking into account the determined free spaces.

10. A process for displaying contents on data spectacles comprising a spectacles frame and a display, the process comprising the acts of:
- receiving an image from an imaging unit, the imaging unit being arranged to provide an image of an eye of a wearer or the data spectacles;
- determining a viewing direction of an eye in the image;
- determining a display area on a display on which an activating element is displayed;
- determining whether the viewing direction of the eye is aimed at the display area of the activating element;
- in response to meeting a defined condition, displaying contents assigned to the activating element on a larger display area than the display area of the activating element, wherein the condition is that the viewing direction of the eye is aimed at the display area of the activating element;
- determining that the viewing direction of the eye is not aimed at the larger display area of the assigned contents; and
- in response to determining the viewing direction of the eye is not aimed at the larger display area of the assigned contents after the displaying of the assigned contents, terminating the displaying of the assigned contents on the display.

11. A computer product, comprising a non-transitory computer readable medium having stored thereon program segments that:
- receive an image from an imaging unit, the imaging unit being arranged to provide an image of an eye of a wearer or the data spectacles;
- determine a viewing direction of an eye in the image;
- determine a display area on a display on which an activating element is displayed;
- determine whether the viewing direction of the eye is aimed at the display area of the activating element;
- in response to meeting a defined condition, displaying contents assigned to the activating element on a larger display area than the display area of the activating element, wherein the condition is that the viewing direction of the eye is aimed at the display area of the activating element;
- determine that the viewing direction of the eye is not aimed at the larger display area of the assigned contents; and
- in response to determining the viewing direction of the eye is not aimed at the larger display area of the assigned contents after the displaying of the assigned contents, terminating the displaying of the assigned contents on the display.

12. The process of claim 10, wherein the imaging unit is at least one camera.

13. The process of claim 10, further comprising determining the viewing direction of the eye at the display area of the activating element based on a determination that the viewing direction of the eye is directed at the display area of the activating element for longer than a defined threshold value time.

14. The process of claim 10, further comprising:
- providing, by a video camera mounted on a vehicle, video images of surroundings of the vehicle; and
- receiving the video images from the video camera; and
- presenting the video images as the assigned contents on the display.

15. The process of claim 10, further comprising activating an application in response to meeting the defined condition.

16. The process of claim 10, further comprising:
- controlling the display such that several activating elements are displayed in respectively different display areas on the display of the data spectacles;
- determining a respective display area for each of the several activating elements;
- determining whether and which of the respective display areas the eye of the wearer is aimed at; and
- displaying, in response to the eye of the wearer being aimed at a respective display area, assigned contents assigned to the activating element of the display area, wherein the assigned contents are displayed on a larger display area of the activating element.

17. The process of claim 10, further comprising:
- receiving an instruction for operating a mechanical operating element; and
- determining whether the instruction is received simultaneously or within a predefined time period in which it is determined that the viewing direction of the eye is aimed at the display area of the activating element,
- wherein the defined condition further comprises that the instruction is received simultaneously or within the predefined time period.

18. The process of claim 10, wherein the imaging unit is mounted at the data spectacles.

19. The process of claim 10, wherein the data spectacles are configured for use in a vehicle, and wherein the process further comprises:
- determining, by a sensor, a head position and a head orientation of the wearer of the data spectacles; and
- determining free spaces of the display in which a presentation is essentially not superimposed on surroundings outside the vehicle or surroundings relevant to a driving task from a view of the wearer of the data spectacles,
- wherein the display area of the presentation is selected while taking into account the determined free spaces.

* * * * *